United States Patent [19]
Kuwayama et al.

[11] 3,819,327
[45] June 25, 1974

[54] METHOD OF PRINTING SYNTHETIC FIBERS

[75] Inventors: Hiroji Kuwayama, Shiga; Hiroyuki Kajita, Osaka; Tadashi Asayama; Nobuyuki Nishio, both of Kyoto, all of Japan

[73] Assignee: Meisei Chemical Works, Ltd., Ukyo-ku, Kyoto, Japan

[22] Filed: June 28, 1972

[21] Appl. No.: 267,098

[30] Foreign Application Priority Data
June 30, 1971 Japan.................................. 46-47792

[52] U.S. Cl.............................................. 8/172, 8/1
[51] Int. Cl............................................... D06p 1/86
[58] Field of Search.................................. 8/172

[56] References Cited
UNITED STATES PATENTS
3,498,981  2/1970  Noda et al. ............................. 8/172
3,565,572  2/1971  Schneider ............................... 8/172

FOREIGN PATENTS OR APPLICATIONS
1,474,736  10/1965  France .................................. 8/172
1,105,595  3/1968  Great Britain .......................... 8/172

*Primary Examiner*—Donald Levy
*Attorney, Agent, or Firm*—Morgan, Finnegan, Durham & Pine

[57] ABSTRACT

The method of printing synthetic fibers and chemical fibers such as polyamide, and polyester, polyacrylonitrile and acetate fibers with disperse dyes, cationic dyes and acid dyes employs a compound represented by the general formula

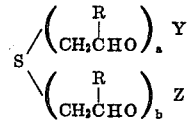

wherein R is -H or -$CH_3$; $a$ is an integer from 1 to 6 and $b$ is an integer from 0 to 3, provided $a+b$ is six or less; and Y and Z are -H or -$CH_2CH_2CN$, provided Y and Z are not -H at the same time.

5 Claims, No Drawings

METHOD OF PRINTING SYNTHETIC FIBERS

BACKGROUND OF THE INVENTION

This invention relates to a method of printing synthetic and chemical fibers such as polyamide, and polyester.

Generally, since synthetic or chemical fibers such as polyamide and polyester, fibers are poor in respect of the rate of dyeing, high temperatures and long periods of time are required for dyeing these fibers and sometimes a carrier must be additionally used. This leads to disadvantages such as increased labor, decreased efficiency of operation and increased cost of processing.

We have conducted researches for many years with respect to these points concerning the dyeing of these synthetic and chemical fibers, resulting in the accomplishment of the present invention.

The principal object of the invention is to provide an improved method of printing synthetic and chemical fibers with disperse dyes, cationic dyes and acid dyes to dye those fibers in deep color with ease in a short period of operation, while ensuring that the resulting dyed articles are superior in color fastness to washing, color fastness to light and color fastness to sublimation.

SUMMARY OF THE INVENTION

The present invention is particularly directed to a method of printing polyamide and polyester, polyacrylonitrile and acetate fibers with disperse dyes, cationic dyes and acid dyes. The method according to the invention comprises employing and incorporating in a printing paste a compound represented by the general formula:

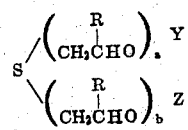

wherein R is -H or -CH$_3$; $a$ is an integer from 1 to 6 and $b$ is an integer from 0 to 3, provided $a + b$ is 6 or less; and Y and Z are -H or -CH$_2$CH$_2$CN, provided Y and Z are not -H at the same time.

Among the compounds represented by the above formula there may be included cyanoethoxyethyl hydroxyethyl sulfide, bis(cyanoethoxyethyl)sulfide, cyanoethoxyethanol, diethenoxy cyanoethyldiethenoxy sulfide and bis(cyanoethyl triethenoxy)sulfide.

DETAILED DESCRIPTION OF THE INVENTION

Although the mechanism of the present compound exhibiting the described effects has not yet been known, it seems that one of the reasons therefor is that the present compound is well suited for relaxing and swelling these fibers so that dyes easily and quickly diffuse into the fibers. Further, it is well known that the molecules of a dye form a large aggregate in an aqueous solution, which causes to decrease the rate of dyeing. It may be conceived that the present compound becomes slightly bonded with disperse dyes, cationic dyes and acid dyes through hydrogen bond etc. and disintegrates the dye aggregate into single dye molecules, thereby increasing the rate of dyeing.

The compounds used in the present invention represented by the aforesaid general formula may be produced by any known methods. There may be cases where these compounds are hardly soluble in water. Therefore, in use, there may be cases where it is convenient to incorporate suitable auxiliaries, e.g. dispersing agents, solvents, thickners, emulsion pastes, etc. This does not matter at all, of course.

Heretofore, it has been known that among swelling agents for polyamide and polyester, fibers there are included phenols, ethers, esters, ketones, amides, halogenated hydrocarbons, aromatic hydrocarbons, rhodanates, dimethyl sulfoxides, etc. But when they are utilized in dyeing operation, their poor miscibility and poor compatibility with disperse dyes and cationic dyes result in the precipitation and coagulation of these dyes or in color unevenness in the colored articles; or they make the fibers rough and stiff; or it is difficult to remove them from the fibers as dyed. The present invention eliminates these disadvantages at the aforesaid superior effects.

The cationic dyes used in the invention are all the dyes that have cationic groups; the disperse dyes are those dyes that are almost insoluble in water and that are conventionally used for dyeing synthetic fibers; and the acid dyes are anionic dyes conventionally used for dyeing wool and polyamide fibers.

In carrying out the present method of printing, various manners of printing may be employed. The amount of the before-mentioned compound to be used in the invention at such time is usually 10 – 60 g/kg relative to the printing paste. The temperature and duration for carrying out the dye fixing treatment after printing according to the present method are 100° to 120° C and 3 to 10 minutes in the case of steam-heating, and, 140° to 200° C and 30 to 90 seconds in the case of dry heating, respectively. Thus, dyeing can be completed in a very short time as compared with the case where the present method is not utilized.

Preferably, the fibers to which the invention is applicable are polyamide fibers comprising long-chain synthetic high molecules in which the binding between monomers is mainly by amide bonding

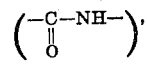

polyester fivers comprising long-chain synthetic molecules in which the binding between monomers is mainly by ester bonding.

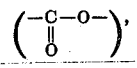

This is a linear polyester.

As for product forms, they may be any of fibers, yarn and fabrics. As described above, the invention enables polyamide and polyester, fibers to be printed in deep color with disperse dyes, cationic dyes and acid dyes in a much shorter time of operation than in any of conventional methods.

DETAILED DESCRIPTION OF THE PREFERRED EMBODIMENTS

The following examples serve to illustrate the invention in more detail although the invention is not limited to these examples. Unless otherwise indicated, the

EXAMPLE 1.

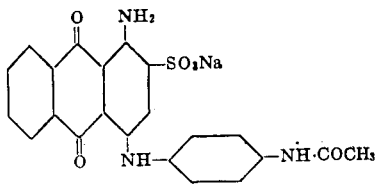

30 parts of Suminol Levelling Blue AGG(acid dye produced by Sumitomo Kagaku KK. of Japan and identified by C. I. 62125 having the above formula) was mixed with 30 parts of ethylene glycol monobutyl ether and 360 parts of boiling water was added thereto to dissolve the dye completely. This was added to 500 parts of paste of 10 percent Incalca ABV (produced by Cesalpinia S.P.A., Milano, Italy), followed by addition of a solution of 10 parts of ammonium tartrate in 50 parts of water, to which was further added 20 parts of diethenoxy cyanoethyldiethenoxy sulfide, with the final addition of water to bring the total up to 1,000 parts. The printing paste was used to print nylon taffeta (polyamide fabric), which after drying, was subjected to dry heating at 190° C for 90 seconds, washing with water and drying.

The amount of exhaustion for this dyed fabric was compared with that for a dyed fabric, which has been dyed with a recipe in which the diethenoxy cyanoethyldiethenoxy sulfide was excluded from the above mentioned paste. The result was as follows:

The amounts of exhaustion were measured by using Hitachi Recording Spectrophotometer EPR-2.

| | Amount of Exhaustion |
|---|---|
| When diethenoxy cyanoethyl-diethexy sulfide was added | 80.7% |
| When diethenoxy cyanoethyl-diethenoxy sulfide was not added | 59.3% |

EXAMPLE 2.

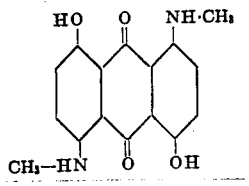

30 parts of Sumikaron Blue S–BG (disperse dye produced by Sumitomo Kagaku KK. of Japan and identified by C. I. 63305 having the above formula) was dispersed into 200 parts of hot water. The dispersion liquid was added to 500 parts of sodium alginate (4 percent paste), to which was added 50 parts of bis(cyanoethyl triethenoxy) sulfide, with the final addition of water to bring the total up to 1,000 parts. This paste was used to print "Tetron" taffeta (polyester fabric) which, after drying, was subjected to treatment with dry heat at 200° C for 30 seconds, washing with water, reduction clearing, washing with water and drying. The fabric thus obtained was compared with respect to the amount of exhaustion with a printed fabric obtained in the same manner but using a recipe in which the addition of bis(cyanoethyl triethenoxy) sulfide in the aforesaid paste was omitted and instead of 100 parts of urea was added. In this connection Hitachi Recording Spectrophoto meter EPR–2 was used. The result was as follows:

| | Amount of exhaustion |
|---|---|
| When bis(cyanoethyl triethyenoxy) sulfide was added | 75.8% |
| When urea was added | 64.2% |

What we claim is:

1. In a method of printing polyamide and linear polyester fibers with disperse dyes, cationic dyes and acid dyes, the improvement which comprises employing a compound of the general formula:

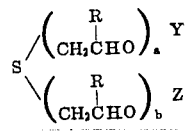

wherein R is -H or -CH$_3$; $a$ is an integer from 1 to 6 and $b$ is an integer from 0 to 3, provided $+ b$ is six or less; and Y and Z are -H or -CH$_2$CH$_2$CN, provided Y and Z are not -H at the same time or cyanoethoxyethanol.

2. A method of printing polyamide and linear polyester fibers as defined in claim 1, in which said compound is selected from the group consisting of cyanoethoxyethyl hydroxyethyl sulfide, bis (cyanoethoxyethyl) sulfide, cyanoethoxyethanol, diethenoxy cyanoethyldiethenoxy sulfide and bis(cyanoethyl triethenoxy) sulfide.

3. A method as defined in claim 1, in which said compound is used in an amount of 10 to 60 parts by weight per 1,000 parts of the printing paste.

4. A method as defined in claim 1, in which the dye fixing treatment is carried out by steam-heating at 100° to 120° C for 3 to 10 minutes.

5. A method as defined in claim 1, in which the dye fixing treatment is carried out by dry-heating at 140° to 200° C and for 30 to 90 minutes.

* * * * *

UNITED STATES PATENT OFFICE
CERTIFICATE OF CORRECTION

Patent No. 3,819,327  Dated June 25, 1974

Inventor(s) Hiroji Kuwayama, Hiroyuki Kajita, Tadashi Asayama, Nobuyuki Nishio

It is certified that error appears in the above-identified patent and that said Letters Patent are hereby corrected as shown below:

Column 4, Claim 1, Line 38, "+b" should be -- a + b --.

Signed and sealed this 10th day of December 1974.

(SEAL)
Attest:

McCOY M. GIBSON JR.  C. MARSHALL DANN
Attesting Officer  Commissioner of Patents